(12) United States Patent
Hekal

(10) Patent No.: US 6,460,271 B2
(45) Date of Patent: *Oct. 8, 2002

(54) INSERT HAVING INTERCONNECTING CHANNEL MORPHOLOGY FOR ALDEHYDE ABSORPTION

(75) Inventor: Ihab M. Hekal, Greenwich, CT (US)

(73) Assignee: CSP Technologies, Inc., Auburn, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/736,559

(22) Filed: Dec. 13, 2000

(65) Prior Publication Data

US 2002/0103271 A1 Aug. 1, 2002

Related U.S. Application Data

(63) Continuation-in-part of application No. 09/504,029, filed on Feb. 14, 2000, which is a continuation-in-part of application No. 09/122,912, filed on Jul. 27, 1998, now Pat. No. 6,214,255, which is a division of application No. 08/611,298, filed on Mar. 5, 1996, now Pat. No. 5,911,937, which is a continuation-in-part of application No. 08/424,996, filed on Apr. 19, 1995, now abandoned.

(51) Int. Cl.$^7$ ............................. F26B 19/00; F17C 11/00
(52) U.S. Cl. ............................. 34/95; 206/204; 428/517; 428/523
(58) Field of Search ............................. 34/95; 206/204; 428/517, 523

(56) References Cited

U.S. PATENT DOCUMENTS

| | | |
|---|---|---|
| 1,481,971 A | 1/1924 | Whiting |
| 1,532,831 A | 4/1925 | Mastin |
| 2,202,742 A | 5/1940 | McCorkhill |
| 2,511,666 A | 6/1950 | Barr |
| 2,638,179 A | 5/1953 | Yard |
| 2,991,500 A | 7/1961 | Hagen |
| 3,013,308 A | 12/1961 | Armour |
| 3,101,242 A | 8/1963 | Jackson, Jr. |
| 3,156,402 A | 11/1964 | Dupuis |
| 3,245,946 A | 4/1966 | O'Connor et al. |
| 3,256,411 A | 6/1966 | Grasty |
| 3,322,355 A | 5/1967 | Bryant |
| 3,326,810 A | 6/1967 | Dolan et al. |
| 3,375,208 A | 3/1968 | Duddy |
| 3,537,676 A | 11/1970 | Miller |
| 3,567,085 A | 3/1971 | Flores |
| 3,687,062 A | 8/1972 | Frank |
| 3,704,806 A | 12/1972 | Plachenov et al. |
| 3,730,372 A | 5/1973 | Komendowski |
| 3,750,966 A | 8/1973 | Anderson |
| 3,804,282 A | 4/1974 | Komendowski |
| 3,833,406 A | 9/1974 | White |
| 3,881,026 A | 4/1975 | Shepherd |
| 3,926,379 A | 12/1975 | Dryden et al. |
| 3,929,295 A | 12/1975 | Montalbano |
| 3,931,067 A | 1/1976 | Goldberg et al. |
| 4,013,566 A | 3/1977 | Taylor |
| 4,021,388 A | 5/1977 | Griffin |
| 4,029,830 A | 6/1977 | Yamamoto |
| 4,036,360 A | 7/1977 | Deffeyes |
| 4,081,397 A | 3/1978 | Booe |
| 4,165,743 A | 8/1979 | Denning |
| 4,201,209 A | 5/1980 | LeVeen et al. |
| 4,240,937 A | 12/1980 | Allen |
| 4,243,767 A | 1/1981 | Kaufman et al. |
| 4,284,548 A | 8/1981 | Kaufman et al. |
| 4,284,671 A | 8/1981 | Cancio et al. |
| 4,387,803 A | 6/1983 | Mercil |
| 4,394,144 A | 7/1983 | Aoki |
| 4,405,360 A | 9/1983 | Cardarelli |
| 4,407,897 A | 10/1983 | Farrell et al. |
| 4,425,410 A | 1/1984 | Farrell et al. |
| 4,447,565 A | 5/1984 | Lula et al. |
| 4,464,443 A | 8/1984 | Farrell et al. |
| 4,485,204 A | 11/1984 | Nabors |
| 4,533,576 A | 8/1985 | Tanahashi et al. |
| 4,547,536 A | 10/1985 | Nabors |
| 4,554,297 A | 11/1985 | Dabi |
| 4,573,258 A | 3/1986 | Io et al. |
| 4,665,050 A | 5/1987 | Degan et al. |

(List continued on next page.)

FOREIGN PATENT DOCUMENTS

| | | |
|---|---|---|
| DE | 4013799 | 10/1991 |
| EP | 0172714 A1 | 2/1986 |
| EP | 0225 593 A3 | 6/1987 |
| WO | 931087639 | 9/1993 |
| WO | WO 96/29603 | 9/1996 |
| WO | WO 96/33108 | 10/1996 |
| WO | PCT/US97/03610 | 5/1997 |
| WO | PCT/WO97/27483 | 7/1997 |
| WO | PCT/WO97/32663 | 9/1997 |
| WO | PCT/WO98/39231 | 9/1998 |

*Primary Examiner*—Suzanne E. McDowell

(57) ABSTRACT

A method of making an insert and an insert for aldehyde absorption having a co-continuous interconnecting channel morphology comprising at least three components, (a) wherein component A is selected from the group of polymers that are semicrystalline polymers and amorphous polymers, wherein the amorphous polymers have a shear modulus greater than about 8 MPa; (b) wherein component B is a polymer; (c) wherein components A and B are immiscible within each other and, if components A and B react after mixing, components A and B are immiscible prior to reaction; (d) wherein component C is a particle and comprises a sulfite compound; (e) wherein the volume fraction of component A represents at least about 50% by volume of the total volume of components A, B and C; (f) wherein the preferential affinity between component B and component C is greater than between component A and component C; (g) wherein at least two phases are formed, one phase is composed of a majority of component A, and the second phase is composed of a majority of component B and a majority of component C; and (h) wherein the two phases form the co-continuous interconnecting channel morphology.

6 Claims, 1 Drawing Sheet

U.S. PATENT DOCUMENTS

| | | |
|---|---|---|
| 4,686,093 A | 8/1987 | Flanigen et al. |
| 4,725,393 A | 2/1988 | Nasu |
| 4,770,944 A | 9/1988 | Farrell et al. |
| 4,772,300 A | 9/1988 | Cullen et al. |
| 4,783,056 A | 11/1988 | Abrams |
| 4,783,206 A | 11/1988 | Cullen et al. |
| 4,792,484 A | 12/1988 | Moritani |
| 4,834,234 A | 5/1989 | Sacherer et al. |
| 4,969,998 A | 11/1990 | Henn |
| 4,994,312 A | 2/1991 | Maier et al. |
| 5,078,909 A | 1/1992 | Shigeta et al. |
| 5,114,003 A | 5/1992 | Jackisch et al. |
| 5,118,655 A | 6/1992 | Pedersen |
| 5,128,182 A | 7/1992 | Bunker et al. |
| 5,130,018 A | 7/1992 | Tolman et al. |
| 5,143,763 A | 9/1992 | Yamada et al. |
| 5,154,960 A | 10/1992 | Mucci et al. |
| 5,242,652 A | 9/1993 | Savigny |
| 5,267,646 A | 12/1993 | Inoue et al. |
| 5,286,407 A | 2/1994 | Inoue et al. |
| 5,288,532 A | 2/1994 | Juhl et al. |
| 5,304,419 A | 4/1994 | Shores |
| 5,320,778 A | 6/1994 | Miksic et al. |
| 5,344,589 A | 9/1994 | Miksic et al. |
| 5,393,457 A | 2/1995 | Miksic et al. |
| 5,399,609 A | 3/1995 | Moss |
| 5,415,907 A | 5/1995 | Inoue et al. |
| 5,432,214 A | 7/1995 | Lancesseur |
| 5,494,155 A | 2/1996 | Evans et al. |
| 5,496,397 A | 3/1996 | Fischer et al. |
| 5,518,761 A | 5/1996 | Hatsuda et al. |
| 5,551,141 A | 9/1996 | De'Ath et al. |
| 5,580,369 A | 12/1996 | Belding et al. |
| 5,596,051 A | 1/1997 | Jahns et al. |
| 5,633,351 A | 5/1997 | Reed |
| 5,656,503 A | 8/1997 | May |
| 5,773,105 A | 6/1998 | Klett |
| 5,814,136 A | 9/1998 | Wood |
| 5,911,937 A | 6/1999 | Hekal |
| 6,080,350 A | 6/2000 | Hekal |
| 6,124,006 A | 9/2000 | Hekal |
| 6,130,263 A | 10/2000 | Hekal |
| 6,174,952 B1 | 1/2001 | Hekal |
| 6,177,183 B1 | 1/2001 | Hekal |

| Time Interval (min) | Weight (g) | Area | Result (mg) | Concentration (mg/g) |
|---|---|---|---|---|
| 0 | 0.1835 | ND | 0.0 | 0.0 |
| 2.5 | 0.1394 | ND | 0.0 | 0.0 |
| 5 | 0.1649 | 736.9 | 0.61 | 3.5 |
| 15 | 0.1667 | 2160.1 | 2.32 | 13.4 |
| 30 | 0.2108 | 4029.5 | 4.56 | 26.3 |
| 60 | 0.1757 | 5506.6 | 6.34 | 36.5 |
| 90 | 0.1658 | 5992.2 | 6.92 | 39.9 |
| 120 | 0.1537 | 5638.8 | 6.50 | 37.5 |
| 240 | 0.1745 | 7159.3 | 8.32 | 48.0 |
| 360 | 0.1764 | 7290.0 | 8.48 | 48.9 |
| 480 | 0.1962 | 7226.5 | 8.40 | 48.5 |

Average Wt.  0.1734

Projected Capacity:  48.7 mg/g

INSERT HAVING INTERCONNECTING CHANNEL MORPHOLOGY FOR ALDEHYDE ABSORPTION

RELATED APPLICATION

This application is a continuation-in-part of U.S. Ser. No. 09/504,029, filed Feb. 14, 2000, which in turn is a continuation-in-part of U.S. Ser. No. 09/122,912, filed on Jul. 27, 1998, now U.S. Pat. No. 6,214,255 which in turn is a divisional of Ser. No. 08/611,298, filed Mar. 5, 1996 now U.S. Pat. No. 5,911,937, which is a continuation in part of U.S. Ser. No. 08/424,996, filed Apr. 19, 1995, now abandoned.

FIELD OF THE INVENTION

The present invention generally relates to a method and composition for an aldehyde absorbing insert that absorbs aldehyde emitted from containers, including e.g. polyethylene terephthalate ("PET") bottles, which hold a beverage or drink (e.g food product) or other environmentally sensitive products (e.g. pharmaceutical products). In one embodiment, the insert is in a form of a molded cover, including e.g. a screw cap, that is composed, at least in part, of the composition of the present invention. In an embodiment, the composition of the present invention may be in a form of an induction seal. In a further embodiment, the composition of the present invention may be in a form of a liner that has an exterior surface substantially conforming to at least a portion of an interior surface of the container body. In one embodiment, the aldehyde absorber insert is composed of a composition having continuous interconnecting channel morphology comprising three components—two polymers (i.e. components A and B) and a particle (i.e. component C) wherein the channels consist mainly of component B and the majority of component C resides in the channels. Components A and B are generally immiscible within each other. In addition, one criteria for selecting component C and components A and B may be based on component C preferential affinity for component B over component A. Another criteria for selecting component C may be based on the capacity of component C to absorb aldehyde compounds. For example, component C may be a mixture of: (a) an earth alkaline oxide and/or alkaline oxide; and (b) a sulfite such as sodium metabisulfite.

BACKGROUND OF THE INVENTION

Plastic materials offer the packaging industry many benefits including a degree of design flexibility. Specifically, polyethylene terephthalate (PET) has made significant inroads into bottling and packaging applications at the expense of the use of glass containers but primarily in applications where the needs for barrier properties are modest. An increased wall thickness is needed to improve the barrier properties of the container but has a negative impact on the economics of the container. The ratio of packaging material to package volume has typically limited PET bottles to multi-serve container uses for packaging of oxygen sensitive foods and beverages such as fruit juices and drinks. In addition, a container such as a bottle composed of plastic (e.g. PET) emits acid aldehyde volatiles that are absorbed by the liquid within the container and that may detrimentally affect the quality of the liquid including the taste and/or stability.

Moreover, when compared to traditional packaging materials such as glass and steel, plastics such as PET offer inferior barrier properties which limits their acceptability for use in packaging items that are sensitive to atmospheric gases, particularly when the exposure to the atmospheric gases will entail extended time periods. In response to this inferior barrier properties, the packaging industry has attempted to develop technology to improve the barrier properties of plastic containers by developing multi-layer containers that offer mixed polymer layers. These laminated packaging containers offer improved barrier properties but sacrifice many of the recycling benefits associated with single layer containers such as PET and polyethylene naphthalate (PEN) bottles. Furthermore, depending on the mixtures of polymers, copolymers, blends, etc., used in the layers, clarity of the layered container is often substantially diminished.

In addition, many containers are typically sealed either by a screw cap and/or an "induction seals" as an additional method of preventing oxygen ingress into the container. In one example, induction seals are generally composed of aluminum foil with a plastic sealant layer with adhesive. Ribbons of this foil/plastic lamination are used by the cap/lid makers to die-cut seals and friction fit them into the caps/lids. In high speed filling lines, once the containers are filled and the caps fitted with induction seals mounted on the container (e.g. bottles, jars, cartons), the containers pass through a radio-frequency tunnel. The radio frequency activates the adhesive on the induction seal liner and it adheres to the container's access rim. In the case of bottles or cartons, the caps/lids are then tightened. In another example, the induction seal may be composed completely of a plastic material that is sealed by a conventional induction heating process.

DETAILED DESCRIPTION OF THE INVENTION

Figures 1A, 1B:
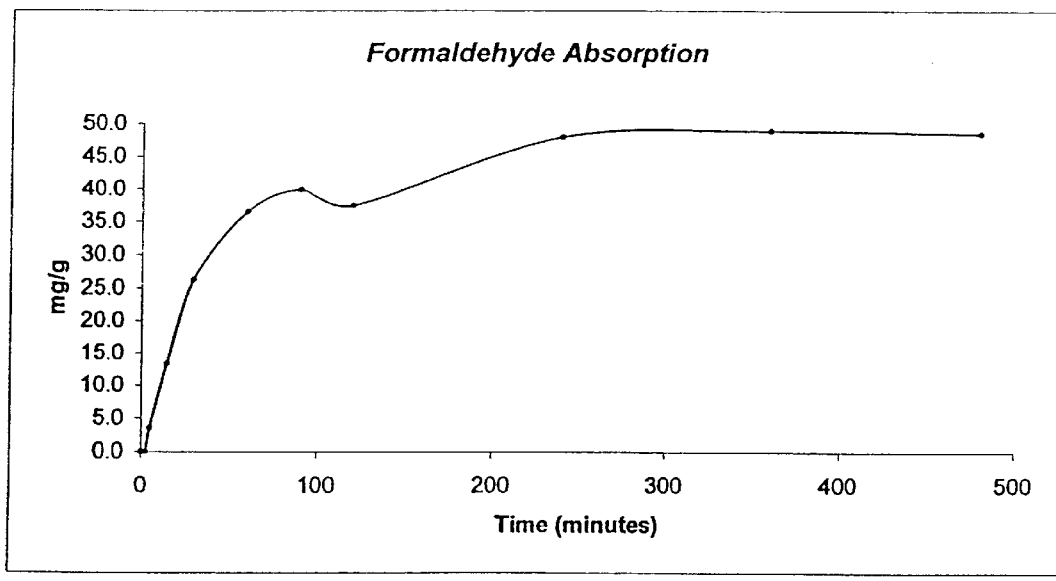
FIG. 1A is absorption data of one embodiment of the present invention.
FIG. 1B is an absorption profile of one embodiment of the present invention.

As required, detailed embodiments of the present invention are disclosed herein; however, it is to be understood that the disclosed embodiments are merely exemplary of the invention that may be embodied in various forms. Therefore, specific structural and functional details disclosed herein are not to be interpreted as limiting, but merely as a basis for the claims and as a representative basis for teaching one skilled in the art to variously employ the present invention.

The present invention relates to an aldehyde absorber insert having an interconnecting channel morphology. In one embodiment, the interconnecting channel morphology composition of the present invention may be formed comprising at least three components, wherein: (a) component A is selected from the group of polymers that are semicrystalline polymers and amorphous polymers, wherein the amorphous polymers have a shear modulus greater than about 8 MPa; (b) component B is a polymer; (c) components A and B are immiscible within each other, and if components A and B react after mixing, components A and B are immiscible prior to reacting; (d) component C is a particle; (e) the volume fraction of component A represents at least about 50% by volume of the total volume of components A, B and C; (f) the preferential affinity between component B and component C is greater than between component A and component C; (g) at least two phases are formed, one phase is composed of a majority of component A, and the second phase is composed of a majority of components B and a majority of component C; and (h) two phases form the co-continuous interconnecting channel morphology.

In an embodiment, components B is selected so that it increases the transport of the aldehyde volatiles through the plastic. Component C is selected so that it has the desired capacity to absorb the volatile aldehydes (e.g. emitted for PET bottles). For example, component C may be a sulfite compound such as sodium metabisulfite.

For purposes of the present invention, the term "phase" means a portion of a physical system that is uniform throughout, has defined boundaries and, in principle, can be separated physically from other phases. The term "water-insoluble polymer" means a polymer having a solubility in water below about 0.1% at 25° C., and atmospheric pressure. The term "hydrophilic agent" is defined as a material that is not substantially cross-linked and that has a solubility in water of at least about 1% at 25° C., and atmospheric pressure. Suitable hydrophilic agents include "channeling" agents. The term "melting point" is defined as the first order transition point of the material determined by DSC. The term "not mutually soluble" means immiscible with each other. The term "immiscibility" means that the components of the blend are driven by thermodynamic forces to separate (i.e. demix) into two or more distinct phases that will coexist indefinitely under equilibrium conditions. An example is the separation of the oil-rich and water-rich phases in a salad dressing. For purposes of the present invention, "partial" immiscibility or "partial" miscibility is deemed "immiscible" and thus, any tendency for a component to phase separate from another component is deemed "immiscible." Immiscibility may be determined by the application of one or more forms of microscopy (e.g., optical, TEM, SEM or AFM) with an observation that the components are separated into two or more distinct phases. The term "particle" means a dispersed component that is either a crystalline or amorphous solid, or a crosslinked organic or inorganic material, and that retains its shape, aside from recoverable deformations, before, during, and after the blend is compounded in the molten state at elevated temperatures. This would include, e.g., a crosslinked polymer latex.

Further, for purposes of the present invention, the term "co-continuous interconnecting channel morphology" means that the minor phase (i.e., component B) is drawn out into interconnected channels that contain a percolation path, while simultaneously, the majority phase (i.e., component A) is percolating. "Percolation" means that there exists at least one unbroken path, composed only of points from within that phase, that will lead from any surface of a sample through the interior of the sample to any other surface. Such a percolation path provides a route for a desired object, such as a small molecule, an atom, an ion, or an electron, to be macroscopically transported across the sample while contacting only one of the phases. For some systems, the existence of an interconnecting channel morphology that is co-continuous may be determined by a minimum of two transport measurements that demonstrate percolation in both minor and major phases. Percolation theory is a mature branch of mathematics and physical science that is described in a variety of review articles, specialized monographs, and many introductory texts on stochastic processes, probability theory, and statistical mechanics. For example, an introductory treatment of percolation theory is described by D. Stauffer in *Introduction to Percolation Theory*, Taylor and Francis, (London 1985).

The term "preferential affinity" means that the particle (i.e., component C) has a lower interfacial energy when contacting one component than compared to contacting another component. A suitable method for determining "preferential affinity" for the present invention is the following:

(a) Blend the particle with the two components at elevated temperatures in their liquid state. Mix to achieve a macroscopically homogeneous dispersion.

(b) Cool the mixture and allow to solidify.

(c) Use a form of microscopy (e.g., TEM, SEM, and/or AFM) on a thin section to determine which of the two phases most closely contacts each particle in the field of view.

(d) The component that is in the majority in the phase that contacts the largest number of particles is the component with "preferential affinity" for the particle.

Further, the term "shear modulus" is the ratio of a measured shear stress to the magnitude of a small, elastically recoverable, shear strain that is used to produce that stress. The criterion of greater than about 8 MPa refers to the shear modulus measured at room temperature. The "shear modulus" is determined by ASTM test method E143-87 (1998). The term "polymer" means a composition that is made by reacting two or more molecular species ("monomers") to form chemically-bonded larger molecules. The term "semi-crystalline" means that the polymeric component, at ambient temperature, contains regions in which chain segments are packed with spatial registry into a periodic lattice and these regions are of sufficient size and extent to exhibit a detectable melting endotherm in a differential scanning calorimetry (DSC) measurement. The term "amorphous" means that the polymeric component, at ambient temperature, either contains no regions of periodic packing of segments, or such regions are undetectable with a DSC measurement.

In an embodiment of the present invention, inserts may be in a form of a molded cover, including e.g. a screw cap, that is composed, at least in part, of the composition of the present invention. In yet another embodiment, the insert of the present invention may be in a form of an induction seal—a closure for a container (e.g. bottle, carton) that includes an inner seal, which is sealed to an outlet opening of the container by a conventional induction heating process or the like to form an "induction" seal. With an induction seal, a hermetic, vacuum retaining seal can be provided for maintaining the integrity of the beverage. This inner seal may also eliminate the possibility of leakage during distribution and storage of the container but is also designed to be removable when the consumer intentionally applies sufficient force so as to access the contents of the container. Further, the induction seal may also prevent the liquid (e.g. beverage) in the container from coming into contact with the closure or cap of the container. In another embodiment, to facilitate removal of the induction the seal, the induction seal may include suitable pull tabs, as is conventional. In another embodiment, the insert may be a closure or cap and further includes a closure base having an internally threaded sleeve which is threadedly joined to the outlet opening of the container.

In yet another embodiment, the insert of the present invention may be used as liners or gaskets in crowns or closures for capping beverage containers. Entire closures may also be made of plastics containing compositions of the invention, for instance all plastic screw-on threaded caps for soft drink bottles, and the like. Another use of the composition of the invention is as a gasket or liner applied and secured to an aluminum or plastic closure or metal crown for plastic or glass bottles.

Component A may typically be selected based on its permeability properties (e.g. barrier properties), its chemical and/or temperature resistance properties, its molding properties, and/or its price (e.g. since it is the component having the largest volume fraction of the composition). In one embodiment, component A may be composed of conventional bottle closure linings such as thermoplastic materials—PVC or EVA, polyethylene terephthalate ("PET"), polyolefins such as polyethylene (PE) or polypropylene (PP), or blends thereof. Other examples of suitable thermoplastic materials may include polyolefins such as polyisoprene, polybutadiene, polybutene, polysiloxane, polycarbonates, polyamides, ethylenevinyl acetate copolymers, ethylene-methacrylate copolymer, poly(vinyl chloride), polystyrene, polyesters, polyanhydrides, polyacrylonitrile, polysulfones, polyacrylic ester, acrylic, polyurethane and polyacetal, or copolymers or mixtures thereof. With respect to component A, in one embodiment, component A may be a water-insoluble polymer. In order to attain the optimum combination of moldability, resilience, sealability, etc., these materials may be formulated to include plasticizers, heat stabilizers, lubricants, blowing agents, antioxidants, pigments, and other additives. These additive components are well known to one skilled in the art.

Similarly, for example, component B may be a polymer that is selected based on its transport properties (e.g. transfer of the aldehydes volatiles) and/or its preferential affinity with component C. Consequently, a specific composition may be uniquely tailored and thus, uniquely optimized for a desired aldehyde absorption. In one embodiment, component B may be a hydrophilic agent. Suitable hydrophilic agents of the present invention may include polyglycols such as poly(ethylene glycol) and poly(propylene glycol) and mixtures thereof. Other suitable B components may be oxides such as polyethylene oxide and other polyoxides and mixtures of polyglycols and polyoxides. Other suitable materials may include EVOH, pentaerithritol, PVOH, polyvinylpyrollidine, vinylpyrollidone or poly(N-methyl pyrollidone), and saccharide based compounds such as glucose, fructose, and their alcohols, mannitol, dextrin, and hydrolized starch being suitable for the purposes of the present invention since they are hydrophilic compounds.

In another embodiment, suitable hydrophilic agents of the present invention may also include any hydrophilic material wherein, during processing, the hydrophilic agent is heated above its melt point upon melt mixing, and subsequently upon cooling separates from the polymer to form the interconnecting channeled structure of the present invention and a three phase system of a water-insoluble polymer, hydrophilic agent and an absorbing material. With respect to component B, for example, component B's loading level can range from about 3% to 5%, 5% to 8%, 8% to 12%, 12% to 15%, 15% to 25% and 25% to 30% by weight with respect to component A.

In one embodiment, Component C is a compound selected from sulfites. For example, sulfites may include, but are not limited to, calcium sulfite, sodium sulfite and potassium sulfite and mixtures thereof. In another example, Component C may be a compound selected from the group of metabisulfites including sodium metabisulfite and potassium metabisulfite and mixtures thereof. In various embodiments, component C's loading level can range from about 3% to 5%, 5% to 10%, 10% to 20%, 20% to 40%, 40% to 60% and 60% to 75% by weight with respect to component A.

In a further embodiment, Component C may be a combination of: (a) earth alkaline oxide and/or alkaline oxide; and (b) sulfite. It is believed that the addition of the earth alkaline oxide and/or alkaline oxide assists in minimizing the sulfur dioxide partial pressure during the reaction of the sulfite with the aldehyde to form a hydroxy sulfonate, which is a stable compound. Suitable earth alkaline oxide and/or alkaline oxide compounds include, but are not limited to, calcium oxide.

For example, one method of forming the composition of the present invention is by adding component C and component B to component A, which in one example is a water-insoluble polymer, when component A is in a molten state; or before component A is in the molten state, so that components B and C may be uniformly blended throughout component A. For example, such a technique may be useful when components A, B and C are all powders. In another embodiment, component B (such as a hydrophilic agent) and component A are mixed prior to adding component C. Component B is either added before component A is in the molten state or after component A is in the molten state. For example, component C may be added to component A during the thermal process of forming sheets. After blending and processing, component B is drawn out into interconnecting channels that contain a percolation path in component A. The majority of component C resides in the interconnecting channels because of its preferential affinity towards component B over component A. In addition, the composition of the present invention may be described as "monolithic" because the composition does not consist of two or more discrete macroscopic layers.

It is believed that the higher the absorbing material (i.e component C) concentration in the mixture, the greater the absorption capacity will be of the final composition. However, the higher absorbing material concentration should cause the body to be more brittle and the mixture to be more difficult to either thermally form, extrude or injection mold. In one embodiment, the absorbing material loading level can range from about 10% to 20%, 20% to 40% and 40% to 60% by weight with respect to the polymer (i.e. component A).

In yet another embodiment, components A, B and C are first dry mixed in a mixer such as a Henschel, and then fed to a compounder. A Leistritz twin screw extruder, for example, or a Werner Pfleider mixer can be used to achieve a good melt mix at about 70° C. to about 95° C. The melt can then be either extruded to form, for example, the final insert or converted into pellets using dry air cooling on a vibrating conveyer. The formed pellets, containing channels, can, for example, then be either injection molded, blow molded or other types of molding into bottles, pouches, containers, caps, or co-injected with a plastic as the inside layer of a container.

In a more specific example, the following components were first uniformly mixed together (all percentages are by weight of total): (a) about 32% of a polyolefin elastomer (manufacturer was DuPont Dow Elastomers and the tradename was "Engage 8401"); (b) about 32% of a polyolefin (manufacturer was Union Carbide and the tradename was "PE 1077"); (c) about 5% of a polyethylene oxide (manufacturer was Union Carbide and the trade name was "Polyox 750"); (d) about 5% of a poly(ethylene glycol) (manufacturer was Dow Chemical, and the tradename was "E-4500"); (e) about 6% of a calcium oxide; and (f) about 20% of a sodium metabisulfite. After the mixture was uniformly mixed, it was fed to Leistritz twin screw extruder operating at about 70° C. to about 95° C. A film of nominal thickness of about 12 mil. was formed. The film was tested for the amount of aldehyde absorption per time. The film sample was cut into 5 m$^2$ pieces and placed in a sealed container with 150 mL of a 37% formaldehyde solution stabilized with methanol. At selected time intervals, a representative film sample and molded part piece were removed and capped in a headspace vial. The samples were tested by gas chromatography. The absorption data is shown in FIG. 1A and the profile of the sample is shown in FIG. 1B.

Moreover, in a further embodiment, it is believed that a composition may be formed having channels composed of two discrete polymers (e.g. components B and B') with each type of channel composed of a majority of either the same particles (e.g. component C) or different particles (e.g. components C and C') where B/B' and C/C' are selected, among other characteristics, based on their preferential affinities with each other. For example, a composition may be formed, wherein: (a) component A is a semicrystalline polymer; (b) component B and B' are polymers; (c) components A, B and B' are immiscible within each other; (d) components C and C' are particles; (e) the volume fraction of component A represents at least about 34% by volume of the total volume of components A, B, B' , C and C'; (f) the preferential affinity between components B and C is greater than either between components A and C and between components B' and C; (g) the preferential affinity between components B' and C' is greater than either between components A and C' and between components B and C'; (h) at least three phases are formed, one phase is composed of a majority of component A, the second phase is composed of a majority of component B and a majority of component C, and the third phase is composed of a majority of components B' and a majority of components C'; and (i) at least three phases form the co-continuous interconnecting channel morphology. It is further believed that such a composition could be designed to have multiple characteristics. For example, a select channel morphology could have high oxygen moisture transmission properties with a majority of inclusion compound residing in these channels and another channel morphology within the same composition could have high aldehyde transmission properties with aldehyde absorbers. In addition, as another example, additional channel morphology may also be designed using additional components (e.g. components B", B'", . . . and C", C'". . . ).

In yet a further embodiment, because the composition of the present invention may typically be more brittle than component A without components B and C, the insert (e.g. cap) may be molded so that an interior portion of the seal is the composition of the present invention while the exterior portions are formed from pure polymer or the composition of the present invention with a lower loading level components B and/or C. For example, an insert having an interior portion composed of the composition of the present invention and an exterior portion composed of pure polymer typically will not only be more durable and less brittle, but it will also act as a gas barrier that resists the transmission of the vapor from the exterior into the interior of the package. In this manner, the absorption capacity of component C is potentiated by exposing it exclusively to the interior of the package from which it is desired that the vapor be withdrawn and retained therefrom.

In another embodiment, the composition of the present invention may be formed into an insert for inclusion within the interior of the container. An example of one form of an insert is a plug or sleeve of any suitable shape. While the plug would serve its purpose by being merely deposited within the container or within the inside of the cap, it may also be fixed to an interior location so that it does move about within the interior space. In a further embodiment, it is anticipated that a plug formed into a disc may be shaped and sized to be pressed fit into the inside of the cap.

In another embodiment, a liner may be formed from the composition of the present invention that has an exterior surface substantially conforming to an interior surface of the container body. Like the disc, the liner may be sized so that it may be press-fit into position within the polymer body where it is held sufficiently snugly to prevent its unintended disengagement therefrom. Alternatively, in a further embodiment, either the plug or liner may be initially constructed and allowed to harden, and then the container body subsequently constructed thereabout so that the greater shrinkage characteristics of the polymer body not containing absorbing material tightly shrink-fits the container body about the plug or liner so that neither becomes easily disengaged from the other. In still a further embodiment, the insert taking the form of either a plug or a liner may be substantially simultaneously comolded (e.g. blowmolded) with the polymer container body so that each is integrally joined with the other. In the event of a co-molding process, the viscosities of the absorbing laden insert and the polymer container body should typically be approximately equal to facilitate the proper and desired location of the two phases of liquid or molten material that are molded together.

What is claimed is:

1. An insert for aldehyde absorption having a co-continuous interconnecting channel morphology comprising at least three components,
    (a) wherein component A is selected from the group of polymers that are semicrystalline polymers and amorphous polymers, wherein the amorphous polymers have a shear modulus greater than about 8 MPa;
    (b) wherein component B is a polymer;
    (c) wherein components A and B are immiscible within each other and, if components A and B react after mixing, components A and B are immiscible prior to reaction;
    (d) wherein component C is a particle and comprises a sulfite compound;
    (e) wherein the volume fraction of component A represents at least about 50% by volume of the total volume of components A, B and C;
    (f) wherein the preferential affinity between component B and component C is greater than between component A and component C;
    (g) wherein at least two phases are formed, one phase is composed of a majority of component A, and the second phase is composed of a majority of component B and a majority of component C; and
    (h) wherein the two phases form the co-continuous interconnecting channel morphology.

2. The insert of claim 1 wherein Component C is a metabisulfite compound.

3. The insert of claim 1 wherein Component C is a mixture of calcium oxide and sodium metabisulfite.

4. The insert of claim 1 wherein the insert is in a form of a cap liner.

5. An insert for aldehyde absorption having a co-continuous interconnecting channel morphology comprising at least three components,
    (a) wherein component A is selected from the group of thermoplastics that are semicrystalline polymers and amorphous, wherein the amorphous polymers have a shear modulus greater than about 8 MPA;
    (b) wherein component B is a polymer;
    (c) wherein components A and B are immiscible within each other and, if components A and B react after mixing, components A and B are immiscible prior to reaction;

(d) wherein component C is a particle and comprises a sulfite compound;

(e) wherein the volume fraction of component A represents at least about 50% by volume of the total volume of components A, B and C;

(f) wherein the preferential affinity between component B and component C is greater than between component A and component C;

(g) wherein at least two phases are formed, one phase is composed of a majority of component A, and the second phase is composed of a majority of component B and a majority of component C; and (h) wherein the two phases form the co-continuous interconnecting channel morphology.

6. An insert for aldehyde absorption having a co-continuous interconnecting channel morphology comprising at least three components, (a) wherein component A is selected from the group of thermosets that are semicrystalline polymers and amorphous polymers, wherein the amorphous polymers, have a shear modulus greater than about 8 MPa;

(b) wherein component B is a thermoplastic;

(c) wherein components A and B are immiscible within each other and, if components A and B react after mixing, components A and B are immiscible prior to reaction;

(d) wherein component C is a particle and comprises an aldehyde compound;

(e) wherein the volume fraction of component A represents at least about 50% by volume of the total volume of components A, B and C;

(f) wherein the preferential affinity between component B and component C is greater than between component A and component C;

(g) wherein at least two phases are formed, one phase is composed of a majority of component A, and the second phase is composed of a majority of component B and a majority of component C; and (h) wherein the two phases form the co-continuous interconnecting channel morphology.

* * * * *